(12) United States Patent
Hebuterne et al.

(10) Patent No.: US 10,035,201 B2
(45) Date of Patent: Jul. 31, 2018

(54) DEVICE AND METHOD FOR REPLACING MACHINING INSERTS

(71) Applicant: SNECMA, Paris (FR)

(72) Inventors: Damien Hebuterne, Moissy-cramayel (FR); Philippe Baron, Rinxent (FR); Janvier Lecomte, Moissy-cramayel (FR); Ange Yondo, Moissy-cramayel (FR)

(73) Assignee: SNECMA, Paris (FR)

( * ) Notice: Subject to any disclaimer, the term of this patent is extended or adjusted under 35 U.S.C. 154(b) by 276 days.

(21) Appl. No.: 15/034,677

(22) PCT Filed: Nov. 5, 2014

(86) PCT No.: PCT/FR2014/052806
§ 371 (c)(1),
(2) Date: May 5, 2016

(87) PCT Pub. No.: WO2015/067886
PCT Pub. Date: May 14, 2015

(65) Prior Publication Data
US 2016/0297013 A1  Oct. 13, 2016

(30) Foreign Application Priority Data

Nov. 8, 2013  (FR) ..................... 13 60950

(51) Int. Cl.
*B23P 6/00* (2006.01)
*B23P 19/04* (2006.01)
(Continued)

(52) U.S. Cl.
CPC ................. *B23C 9/00* (2013.01); *B23C 5/20* (2013.01); *B23P 6/00* (2013.01); *B23P 19/001* (2013.01);
(Continued)

(58) Field of Classification Search
CPC .. B23P 6/00; B23P 19/04; B23P 19/06; B23P 21/00; B23P 21/006; Y10T 29/49829;
(Continued)

(56) References Cited

U.S. PATENT DOCUMENTS 4,552,046 A   11/1985  Dombrowski et al.

FOREIGN PATENT DOCUMENTS

DE      2245481       3/1973

OTHER PUBLICATIONS

International Search Report in pending International Application No. PCT/FR2014/052806 dated Mar. 16, 2015 (2 pages).

*Primary Examiner* — Jermie Cozart
(74) *Attorney, Agent, or Firm* — Bookoff McAndrews, PLLC

(57)    ABSTRACT

The invention relates to a replacement device (1) for replacing machining inserts (900) on a tool (800) comprising a body (810) and a head (820) carrying at least one machining insert (900), each insert being held on the head (820) by a screw. The device (1) comprises:
  a positioner (50) including a holder element (59) suitable for holding the body (810) of the tool;
  a screwdriver station with a screw gun (60) suitable for tightening and loosening the screws, the positioner (50) being suitable for moving the tool relative to the screwdriver station;
  a grip device (70) suitable for picking up and putting down an insert (900);
  a conveyor (500) having a plurality of receptacles (510) for inserts, and having distributed along it a first station (100) with the grip device (70), a second station (200) with a turning mechanism (20) for turning the inserts around, a third station (300) with an unloading mechanism (30) for unloading the inserts, and a fourth station (400) with an insert feed mechanism (40);

(Continued)

a transport mechanism (80) suitable for moving the grip device (70) between the positioner (50) and the first station (100) of the conveyor (500); and a control center (600) suitable for automatically controlling one or more of the mechanisms and devices and/or the conveyor of the replacement device (1).

6 Claims, 6 Drawing Sheets

(51) Int. Cl.
    *B23C 9/00*     (2006.01)
    *B23P 21/00*     (2006.01)
    *B23C 5/20*     (2006.01)
    *B23P 19/00*     (2006.01)
    *B23P 19/06*     (2006.01)

(52) U.S. Cl.
    CPC ............... *B23P 19/04* (2013.01); *B23P 19/06* (2013.01); *B23P 21/00* (2013.01); *B23C 2210/165* (2013.01); *B23P 21/006* (2013.01); *Y10T 29/49829* (2015.01); *Y10T 29/519* (2015.01); *Y10T 29/534* (2015.01)

(58) Field of Classification Search
    CPC ............. Y10T 29/5125; Y10T 29/5135; Y10T 29/5152; Y10T 29/519; Y10T 29/53365; Y10T 29/534; Y10T 29/53483; Y10T 29/53478

See application file for complete search history.

DEVICE AND METHOD FOR REPLACING MACHINING INSERTS

CROSS-REFERENCE TO RELATED APPLICATIONS

This application is the U.S. national phase entry under 35 U.S.C. § 371 of International Application No. PCT/FR2014/052806, filed on Nov. 5, 2014, which claims priority to French Patent Application No. 1360950, filed on Nov. 8, 2013.

The present invention relates to a replacement device for replacing machining inserts on a tool comprising a body and a head carrying a plurality of machining inserts, each insert being held on said head by a screw.

Certain tools used for machining parts present a machining head that has a large number of machining inserts. This applies in particular for certain honeycomb router bits, which may for example have more than twenty machining inserts distributed over the surface of the machining head. Such inserts need to be replaced with new inserts when they become worn, in order to conserve machining quality. Changing all of the inserts is lengthy and tedious for an operator, given the small size of the inserts. Furthermore, a portion of the side face of most inserts is masked by rims of the head of the tool, which makes the inserts difficult to take hold of using pliers. In the long run, such difficulties lead to musculo-skeletal disorders in operators involved in replacing inserts on such tools.

The present invention seeks to remedy such drawbacks.

The invention seeks to propose a device that enables the inserts on a head of a machining tool to be replaced quickly and reliably, without drawbacks for the operator.

This object is achieved by the fact that the device comprises:
- a positioner including a holder element suitable for holding the body of the tool;
- a screwdriver station with a screw gun suitable for tightening and loosening the screws, the positioner being suitable for moving the tool relative to the screwdriver station;
- a grip device suitable for picking up and putting down an insert;
- a conveyor having a plurality of receptacles for inserts, and having distributed along it a first station with the grip device, a second station with a turning mechanism for turning the inserts on themselves, a third station with an unloading mechanism for unloading the inserts, and a fourth station with an insert feed mechanism;
- a transport mechanism suitable for moving the grip device between the positioner and the first station of the conveyor; and
- a control center suitable for automatically controlling one or more of the mechanisms and devices and/or the conveyor of said replacement device.

By means of these provisions, an insert can be changed automatically with minimum intervention on the part of an operator, and in a manner that is more reliable and faster than when performed manually. Furthermore, a large number of inserts on a given machining tool can be changed continuously.

The invention also provides a method of replacing one or more machining inserts on a tool constituted by a body and a head including at least one machining insert, each insert presenting at least one edge and a hole, and being held on the head by a screw passing through the hole.

According to the invention, the method comprises the following steps:
a) providing a positioner having a holder element suitable for receiving the body of the tool, and placing the body in the holder element;
b) using the positioner to position the head so that the screw holding an insert that presents a blunt edge is in alignment with the main axis of a screw gun, and then unscrewing the screw with the screw gun;
c) using a grip device to pick up the insert;
d) providing a conveyor having a plurality of receptacles for inserts and having distributed therealong a first station with the grip device, a second station with a turning mechanism for turning inserts on themselves, a third station with an unloading mechanism for unloading inserts, and a fourth station with a feed mechanism for feeding inserts;
e) using a transport mechanism to move the grip device between the positioner and the first station, and then using the grip device to put the insert down on the receptacle that is facing the first station;
f) if the insert presents at least one sharp edge performing steps g), h), l), and if the insert does not present any sharp edges, performing steps i), j), k), l);
g) causing the conveyor to move so as to bring the receptacle from the first station to the second station and then using the turning mechanism to cause the insert to turn on itself so as to position the sharp edge in the position of the blunt edge;
h) causing the conveyor to move so as to return the receptacle from the second station to the first station;
i) causing the conveyor to move so as to bring the receptacle from the first station to the third station, and then using an unloading mechanism to remove the insert from the receptacle on which it is to be found, so that the receptacle is empty;
j) causing the conveyor to move so as to bring the receptacle from the third station to the fourth station, and then using a feed mechanism to place a new insert on the receptacle;
k) moving the conveyor so as to bring the receptacle from the fourth station to the first station;
l) using the grip device to take hold of the insert, and then using the transport mechanism to transport the grip device from the first station to the positioner, and then placing the insert on its location on the head in such a manner that the hole in the insert is in line with the rod of the screw gun; and
m) placing a screw in the hole and then using the screw gun to screw the insert onto the head of the turntable.

The invention can be well understood and its advantages appear better on reading the following detailed description of an embodiment given by way of non-limiting example. The description refers to the accompanying drawings, in which.

Figure 1:
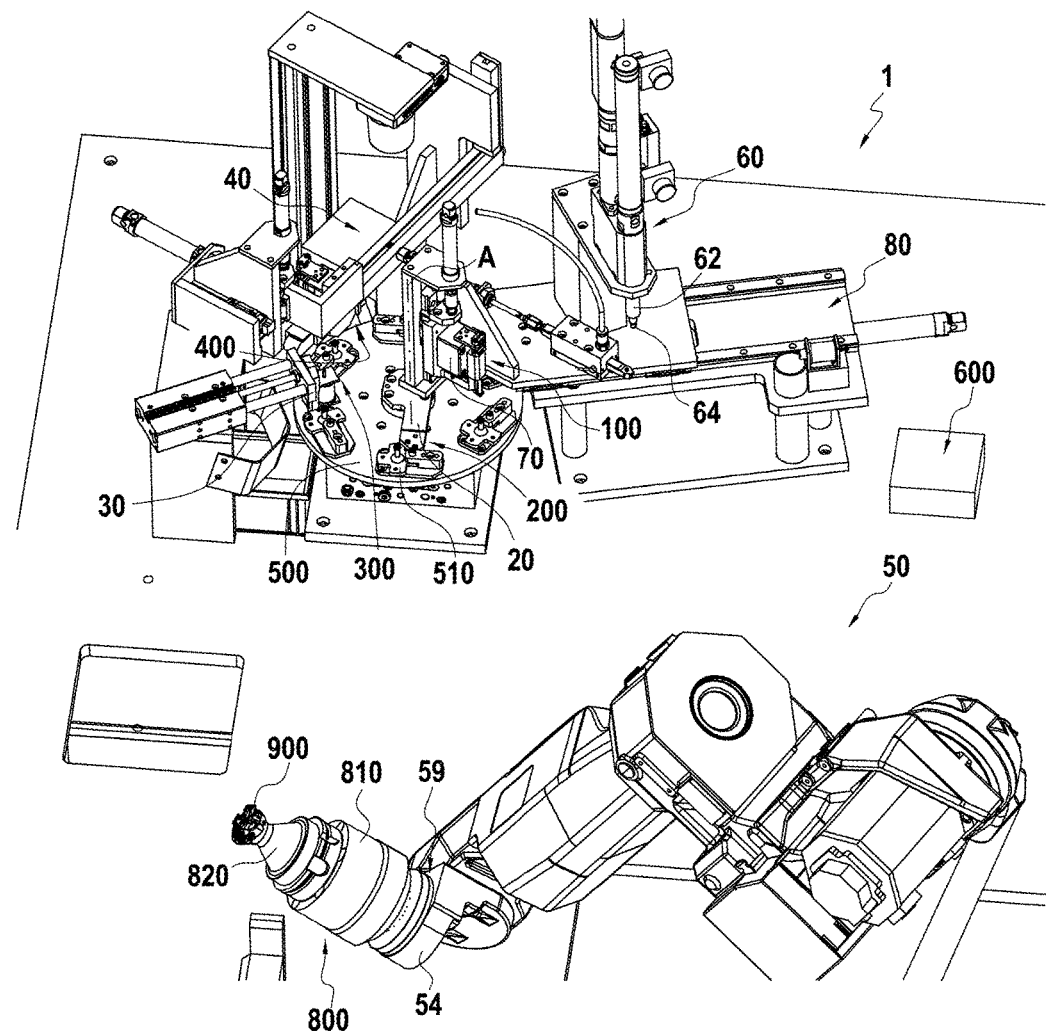
FIG. 1 is a perspective view of the replacement device of the invention.

Consideration is given to a tool 800 comprising a body 810 and a head 820, the head 820 including at least one machining insert 900. The description below relates to the situation in which the head 820 carries a plurality of machining inserts 900, each insert 900 being provided with a hole 930 that passes through it and through which a screw is passed. The screw serves to screw the insert 900 to the head 820 and thus to fasten the insert 900 to the head 820.

Each insert 900 has at least one cutting edge 940 suitable for machining a part.

Each insert 900 shown in the figures has a bottom face 910, a top face 920, and a side face 950 made up of four plane portions such that each insert 900 is a truncated pyramid having the top face 920 as its base and the bottom face 910 as its apex, the insert 900 flaring from the bottom face 910 towards the top face 920. Each insert 900 thus presents four cutting edges 940, each edge 940 being at the junction between the top face 920 and one of the plane portions of the side face 950.

The replacement device 1 of the invention is intended in particular for replacing one or more of these machining inserts 900 when one or more of the edges 940 of the insert 900 are blunted and are therefore no longer sharp enough to machine a part.

The replacement device 1 comprises a plurality of elements that are arranged on a support, as shown in FIGS. 1 to 7:
- a positioner 50 comprising a holder element 59 suitable for holding the body 810 of the tool 800; by way of example, the positioner 50 is a hinged arm with the holder element 59 at its end 54;
- a screwdriver station with a screw gun 60 suitable for tightening and loosening screws;
- a grip device 70 suitable for picking up and putting down an insert 900;
- a conveyor 500 having a plurality of receptacles for inserts 900, and along which there are distributed a first station 100 with the grip device 70, a second station 200 with a turning mechanism 20 for turning the inserts 900 around, a third station 300 with an unloading mechanism 30 for unloading inserts 900, and a fourth station 400 with a feed mechanism 40 for feeding inserts 900;
- a transport mechanism 80 for moving the grip device 70 between the positioner 50 and the first station 100 of the conveyor 500; and
- a control center 600 suitable for automatically controlling the positioner 50, the screw gun 60, the grip device 70, the transport mechanism 80, and the conveyor 500.

The conveyor 500 may be of various kinds, for example a carousel or a looped belt along which the various stations (100, 200, 300, 400) are distributed. For a belt moving round a loop in a single horizontal plane, the stations may be situated on the inside of the loop or on the outside. The conveyor may also be a turntable rotating about an axis of rotation A.

This is a variant that is described below, with reference to FIGS. 1 to 7.

Thus, the conveyor is a turntable 500 rotatable about an axis of rotation A and carrying a plurality of receptacles for inserts 900, and having distributed around it a first station 100 with the grip device 70, a second station 200 with a turning mechanism 20 for turning the inserts 900 around, a third station 300 with an unloading mechanism 30 for unloading the inserts 900, and a fourth station 400 with a feed mechanism 40 for feeding inserts 900.

There follows a description of operating the device 1 of the invention for replacing inserts 900.

As shown in FIG. 1, an operator places the body 810 of the tool 800 in the holder element 59 so that the tool 800 is held firmly and securely to the end 54 of the positioner 50.

In a variant, the end 54 has a clamp with the body 810 being placed between its jaws. The clamp thus constitutes the holder element 59.

The positioner 50 then moves in three dimensions so as to bring the head 820 of the tool 800 up to the screwdriver station.

Figure 2:
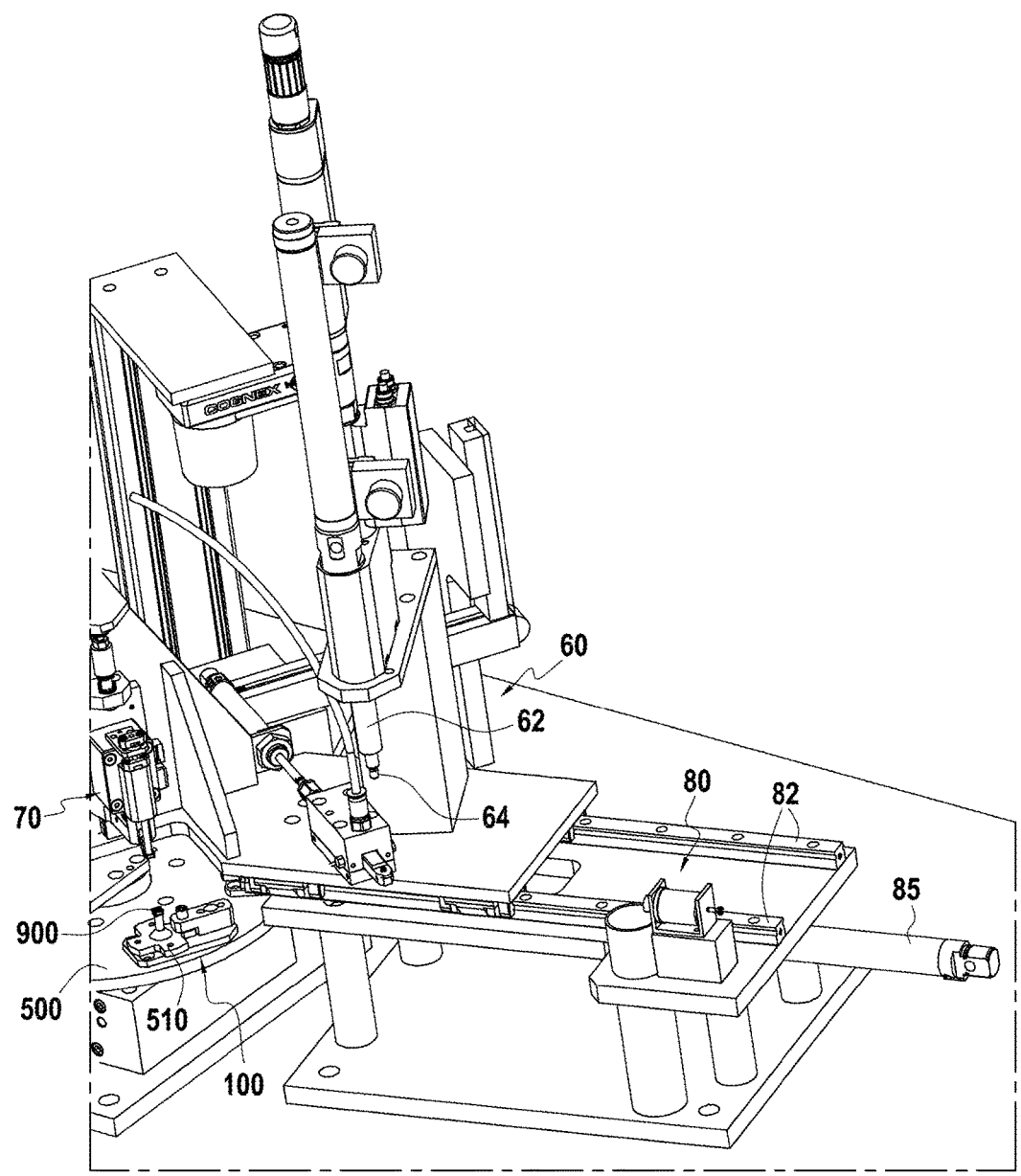
FIG. 2 is a perspective view of the first station of the replacement device of the invention.

This station is shown in FIG. 2.

In general manner, the positioner 50 is suitable for moving towards or away from the screwdriver station.

The positioner 50 places the head 820 exactly beneath the screw gun 60 so that the screw passing through the hole 930 in the insert 900 is in alignment on the main axis of the screw gun 60.

Advantageously, once the head 820 is in position under the screw gun 60, the positioner 50 remains stationary. This limits any risk of the insert dropping off the head 820 once it has been unscrewed.

The screw gun 60 has a motor, and a rod 62 driven by the motor and extending along a main axis, with an endpiece 64 at one end suitable for engaging with the head of a screw holding the insert 900 in order to rotate it and thus tighten it or loosen it. The rod 62 of the screw gun 60 comes up to the screw until its endpiece 64 engages with the head of the screw, and then the screw gun 60 loosens the screw until the insert 900 is released. As a result, the insert 900 is then merely placed on the head 820.

Thereafter, the grip device 70 is placed over the head of the tool 800 so as to pick up the insert 900 after the insert 900 has been unscrewed by the screw gun 60, and then lift the insert 900 so as to move it away from the head 820.

Figure 3:
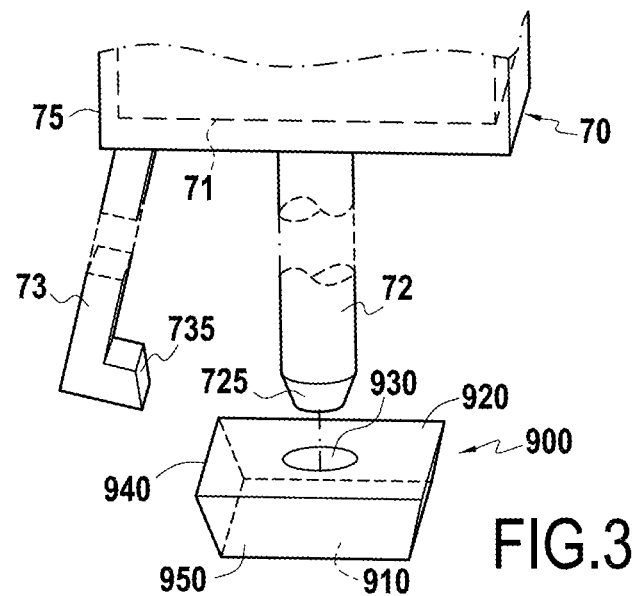
FIG. 3 is a perspective view of the grip device.
Figure 4:
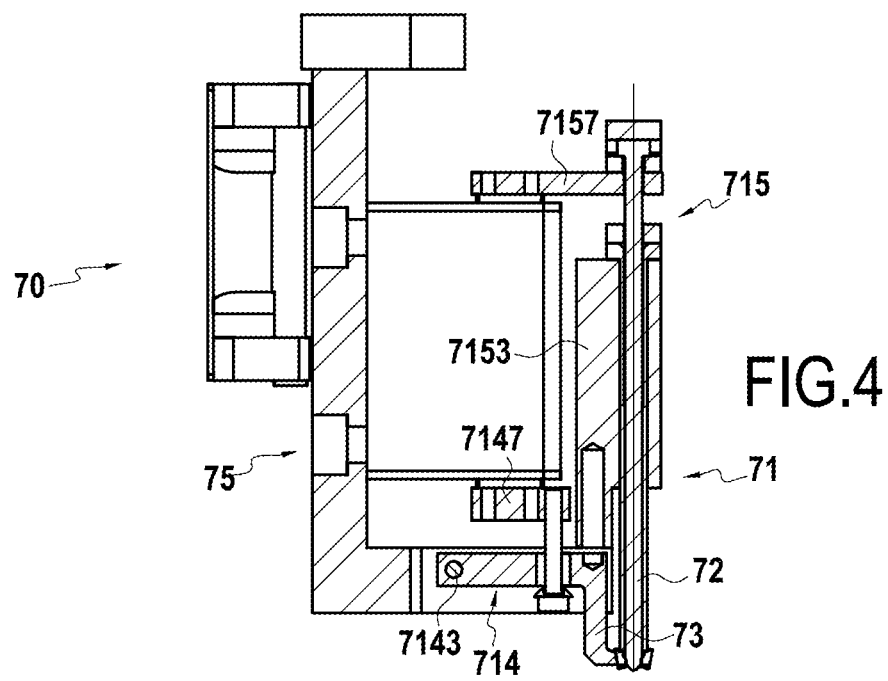
FIG. 4 is a section view of the grip device.

The grip device 70 is described below with reference to FIGS. 3 and 4:

The grip device 70 has control means 71, a circular rod 72, and an arm 73. The control means 71 comprise a hinge mechanism 714 and a shift mechanism 715. The rod 72 and the arm 73 both extend outwards from the control means 71.

The distal portion of the rod 72, which is the portion farthest away from the central portion 75, presents an end 725.

The distal end of the arm 73, which is the portion farthest away from the central portion 75, presents an end face 735.

The term "central portion" 75 is used to designate the region of the grip device 70 that has the proximal portions of the rod 72 and of the arm 73.

The control means 71 are suitable for moving the rod 72 and the arm 73 between an open position and a grip position, as described below.

The hinge mechanism 714 has a pivot connection 7143 with the arm 73 enabling the arm 73 to pivot about the pivot connection 7143, and it also has a drive element 7147 for driving the arm 30 so as to cause the arm 73 to pivot between an open position in which the distal end of the arm 73 is remote from the rod 72, and a grip position in which the distal end of the arm 73 is moved towards the rod 72. The shift mechanism 715 for shifting the rod 72 comprises a guide 7153 in which the rod 72 can slide in translation, and a drive element 7157 for driving the rod 72 so as to shift the rod 72 in translation between an open position (high position in FIG. 3) and a grip position (low position in FIG. 4). The drive element 7147 for driving the arm 73 and the drive element 7157 for driving the rod 72 are driven by a drive mechanism (e.g. using gears and a motor).

In the grip position, the distal end 725 of the rod 72 is pushed into the hole 930 in the insert 900, and the end face 735 of the arm 73 presses against one of the plane portions of the side face 950 of the insert 900. The diameter of the rod 72 tapers towards its distal end 725 so as to penetrate more easily into the hole 930. The end face 735 is plane and thus matches the plane portion of the side face against which it comes to bear. This situation is shown in FIG. 4.

In the grip position, the insert 900 is thus picked up and held between the rod 72 and the arm 73, and it is secured to the grip device 70. The term "secured" is used to mean that the insert 900 cannot be separated from the grip device 70.

The grip device 70 is mounted on two rails 82 that extend between the positioner 50 and the first station 100.

These two rails 82 and a shift device 85 for shifting along these rails form part of the above-mentioned transport mechanism 80.

Thus, the grip device 70, once it has picked up the insert 900, is moved along the rail 82 by the shift device 85 from the positioner 50 to the first station 100 of the turntable 500.

The screw gun 60 is also mounted on these two rails 82.

Thereafter, if necessary, the grip device 70 pivots about a vertical pivot axis so as to place the insert 900 that it has previously picked up over the turntable 500.

The grip device 70 then releases the insert 900 so as to put it down on one of the receptacles 510 of the turntable 500, by passing from a grip position to an open position. This situation is shown in FIG. 2. The turntable 500 has a plurality of receptacles 510 distributed around its circumference, each receptacle 510 being shaped to receive an insert 900 in stable manner. By way of example, each receptacle 510 presents a support 512 suitable for receiving an insert 900 in stable manner. By way of example, the support is a vertical cylinder with a top face on which an insert 900 can be put down.

The grip device 70 is a part of the first station 100.

The four stations (100, 200, 300, 400) are arranged around the turntable 500 in such a manner that on each incremental turn of the turntable 500 as generated by the control center 600, one of the receptacles 510 is immediately facing a respective one of these stations (FIG. 1). An incremental turn of the turntable 500 consists in causing the turntable to turn through a certain angle $\theta_0$, measured relative to the center of rotation of the turntable 500.

Advantageously, the turntable 500 has four receptacles 510 so that while an insert 900 is being processed in one of the four stations (100, 200, 300, 400) distributed around the turntable 500, three other inserts 900 are each being processed in other ones of the other three stations.

In this configuration, the four stations are arranged at the corners of a square centered on the axis of rotation A, i.e. any two adjacent stations are spaced apart by an angle of 90°, which constitutes the incremental turn angle $\theta_0$. The four receptacles 510 are also arranged at the corners of a square such that when one of the receptacles 510 is facing any one of the stations (100, 200, 300, 400), each of the other three receptacles 510 is facing a respective other one of the stations.

As a result, a plurality of inserts 900 can be processed simultaneously, so the productivity of the replacement device of the invention is increased, such that all of the inserts 900 present on a tool 800 can be replaced more quickly.

Alternatively, and as shown in FIG. 1, the turntable 500 may have six receptacles 510.

The incremental turn angle $\theta_0$ may be the angle between two adjacent stations, or the angle between two adjacent receptacles 510.

The incremental turn angle $\theta_0$ is the same between any two adjacent stations, or between any two adjacent receptacles 510. Such an arrangement optimizes the time required for processing a series of inserts 900 in succession.

Alternatively, this incremental turn angle may vary between two adjacent stations or two adjacent receptacles 510.

There follows a description of the processing of an insert 900 after the grip device 70 has put it down in the first station 100 on the receptacle 510 facing the first station 100.

The description begins with the first variant of processing, which is for an insert 900 in which the insert 900 still presents at least one sharp edge 940.

The turntable 500 turns through the angle $\theta_0$ so as to bring the insert 900 to face the second station 200. The second station 200 has a turning mechanism 20 for turning the inserts 900 around, that is suitable for turning an insert 900 through an angle of 90°. When the insert 900 presents one or more blunt edges 940 and at least one sharp edge 940, this second station 200 thus enables the sharp edge 940 to be positioned in such a manner that after the insert 900 has been put back on the head 820 of the tool 800, it is the sharp edge 940 that is in position to machine a part. A sharp edge 940 takes the place of the blunt edge 940 that was previously being used for machining.

In order to position the sharp edge 940 in this way, it may be necessary for the turning mechanism 20 to perform one, two, or three turns through 90°.

Figure 5:
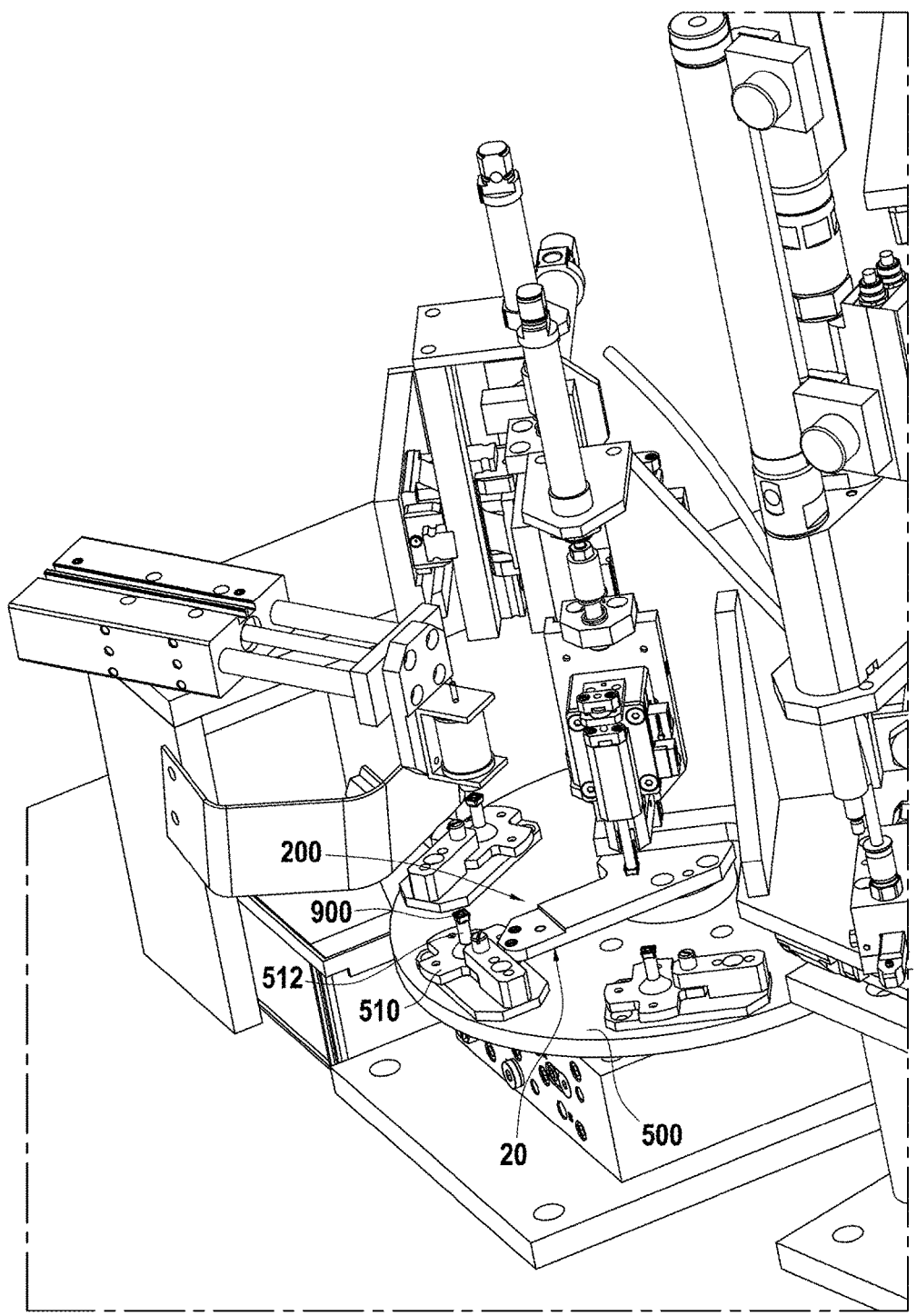
FIG. 5 is a perspective view of the second station of the replacement device of the invention.

By way of example, the turning mechanism 20 may be a mechanical cam, as shown in FIG. 5. This cam causes the insert 900 to turn through an angle of 90°. If necessary, the cam is used twice in order to cause the insert 900 to turn through 180°, or three times in order to cause the insert 900 to turn through 270°.

Thereafter, the turntable 500 turns three times through the angle $\theta_0$ in order to bring the receptacle 510 carrying the insert 900 to the first station 100. The receptacle 510 therefore does not stop at the second station 200 or at the third station 400.

There follows a description of the second variant of processing, which is for an insert 900 in which the insert 900 no longer has any sharp edges 940.

Under such circumstances, the insert 900 needs to be replaced by a new insert 900.

The turntable 500 turns twice through the angle $\theta_0$ in order to bring the receptacle 510 carrying the insert 900 directly to the third station 300. The receptacle 510 therefore does not stop at the second station 200.

Figure 6:
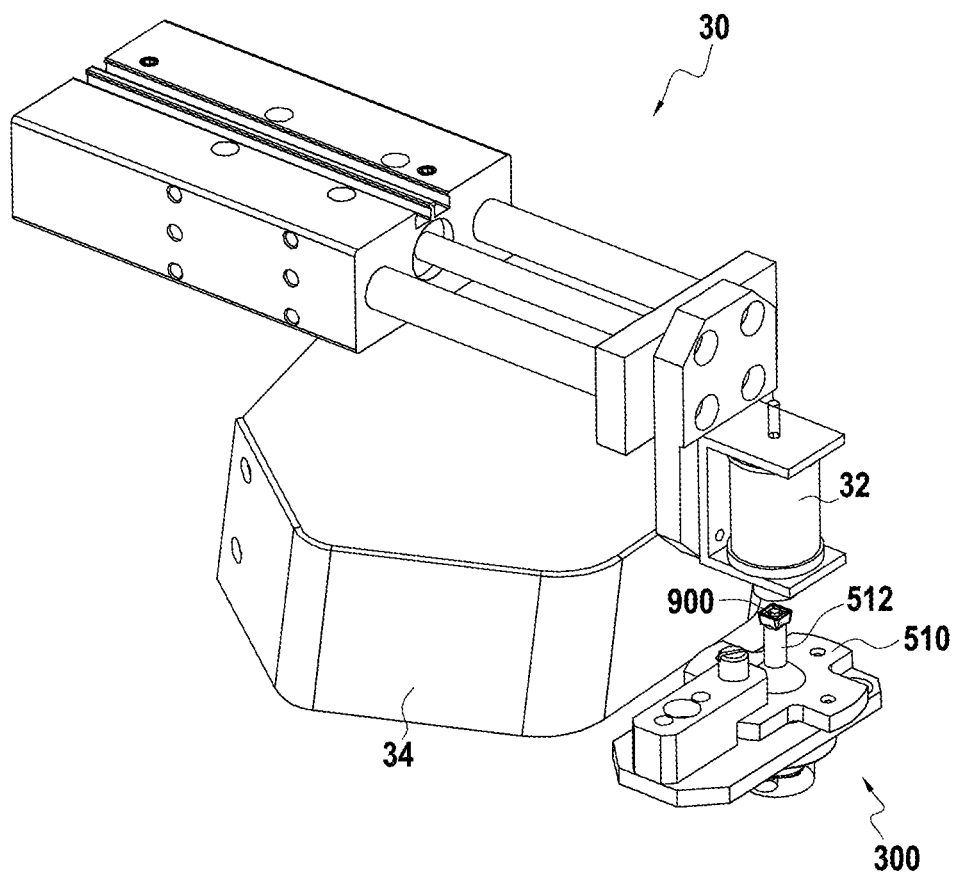
FIG. 6 is a perspective view of the third station of the replacement device of the invention.

As shown in FIG. 6, the third station 300 has an unloading mechanism 30 for unloading the insert 900, which mechanism is suitable for removing the insert 900 from the receptacle 510 on which it is to be found, and for discharging the insert 900 into a container. The unloading mechanism 30 has a remover mechanism 32 and a recovery bin 34. By way of example, this remover mechanism 32 is an arm with an electromagnet that attracts the insert 900 and removes it from the receptacle 510. The remover mechanism 32 then takes up a position over the recovery bin 34 and releases the insert 900 which drops into the bin 34.

The turntable 500 then turns through the angle $\theta_0$ in order to bring the receptacle 510, now without an insert, to the fourth station 400. The receptacle 510 is thus empty.

The fourth station 400 has a feed mechanism 40 for feeding new inserts 900.

Figure 7:
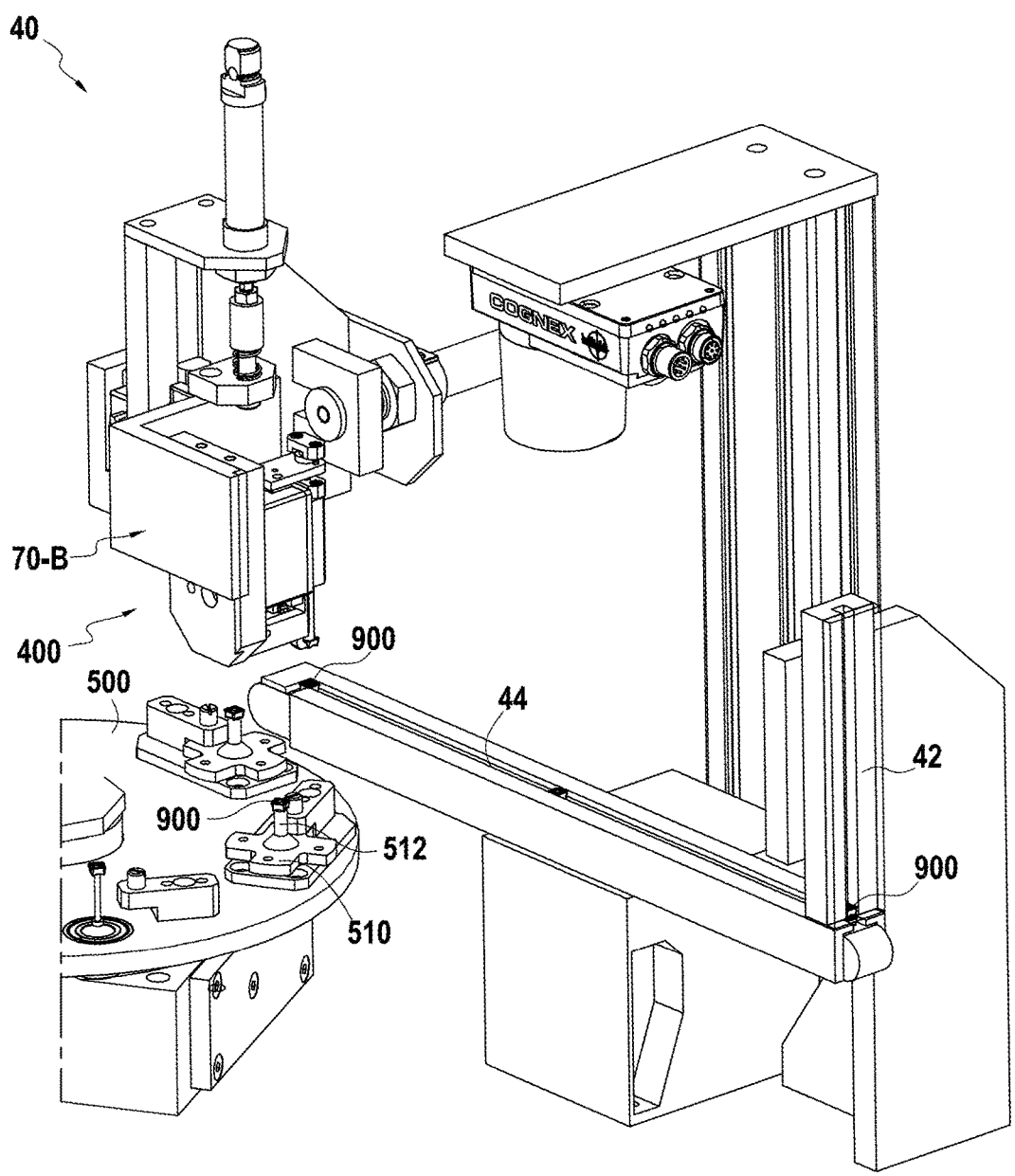
FIG. 7 is a perspective view of the fourth station of the replacement device of the invention.

For example, as shown in FIG. 7, the feed mechanism 40 comprises a magazine 42, which is a vertical rail having new inserts 900 stacked therein, a conveyor 44, and a grip device 70-B identical to the above-described grip device 70.

The bottom end of the magazine 42 is positioned over one of the ends of the conveyor 44, and the other end of the conveyor 44 is positioned in the proximity of the receptacle 510 when the receptacle 510 is at the fourth station 400.

When the empty receptacle 510 is situated at the fourth station 400, the magazine 42 releases a new insert 900 (by opening a hatch at the bottom end of the magazine 42), which insert then drops onto the conveyor 44, and the conveyor 44 then takes the new insert 900 to under the grip device 70-B. The grip device 70-B picks up the new insert 900 and puts it down on the receptacle 510.

By way of example, the magazine 42 may be filled with new inserts 900 manually by an operator who inserts the inserts 900 via the top end of the magazine 42.

The turntable 500 then turns through the angle $\theta_0$ to bring the receptacle 510 now carrying the new insert 900 to the first station 100.

In both of the first and second above-described variants, an insert 900 (already used and turned around in the first variant, or new in the second variant) is then situated on the receptacle 510 facing the first station 100.

This insert 900 is then picked up by the grip device 70 as described above. The transport mechanism 80 then transports the grip device 70 from the first station 100 to the positioner 50.

The grip device 70 then puts the insert 900 down on its location on the head 820.

A new screw is then brought up to the hole 930 in the insert 900, in conventional manner.

By way of example, the new screw may be brought up by means of a hollow pipe having one end connected to a tank full of screws: a screw runs along the pipe and arrives over the hole 930.

Once the insert 900 has been positioned on the head 820 by the grip device 70 and the transport mechanism 80, it is situated facing the endpiece 64 (the hole 930 in the insert 900 and the screw in this hole 930 then lying in line with the rod 62 of the screw gun 60), given that the head 820 has remained stationary. The screw gun 60 then tightens the screw so as to fasten the insert 900 on the head 820 of the tool 800.

Alternatively, a screw is brought up in such a manner as to be picked up by the endpiece 64, and then the screw gun 60 engages the screw in the hole 930 and fastens the insert 900 to the head 820 of the tool 800.

The tightening torque for the screw is selected in such a manner that the insert 900 is held firmly against the head 820.

By way of example, the tightening torque may be approximately equal to 1.2 newton meters (N·m).

In the above description, all of the movements of the positioner 50, of the turntable 500, and of the other mechanisms of the replacement device 1 are performed automatically under the control of the control center 600.

In general manner, the control center 600 can control one or more of the mechanisms and devices and/or the turntable 500.

Detecting whether an edge 940 of an insert 900 is blunt or sharp may be performed visually by an operator for each insert 900.

Advantageously, the tool 800 includes a chip (e.g. of a chip of the "Balluff" type) that records and tracks the history of each insert 900 on the head 820. This chip thus contains information about the number of times each edge 940 of each insert 900 has been used, and consequently about the degree of wear of each of its edges, or about the fact that an edge has never been used. This data is transferred to the control center 600, and is used to control the movements of the turntable 500 and of the various mechanisms in the stations (100, 200, 300, 400) in order to direct each insert 900 automatically to processing either by the first variant or by the second variant, as described above.

The device 1 of the invention for replacing inserts 900 and the method of the invention for replacing inserts 900 apply equally well to the situation in which the tool 800 carries only one insert or carries a plurality of inserts.

When the tool 800 has a plurality of inserts 900, the control center 600 may be programmed so that after replacing (or turning around) any insert 900, the control center 600 positions the positioner 50 and the head 820 of the tool 800 so that the next insert 900 can be processed (replaced or turned around) by the device 1.

The device of the invention is described above for machining inserts 90 that are in the shape of a truncated pyramid. The machining inserts 90 could equally well be of more general shape, within the limit of shapes enabling them to be picked up by the grip device 70.

The invention claimed is:

1. A replacement device for replacing machining inserts on a tool comprising a body and a head carrying at least one machining insert, said at least one insert being held on said head by a screw, comprising:
   a positioner including a holder element suitable for holding said body of said tool;
   a screwdriver station with a screw gun suitable for tightening and loosening said screws, said positioner being suitable for moving said tool relative to said screwdriver station;
   a grip device suitable for picking up and putting down said insert;
   a conveyor having a plurality of receptacles for inserts, a first station with said grip device, a second station with a turning mechanism for turning said inserts on themselves, a third station with an unloading mechanism for unloading said inserts, and a fourth station with an insert feed mechanism being distributed along said conveyor;
   a transport mechanism suitable for moving said grip device between said positioner and said first station of the conveyor; and
   a control center suitable for automatically controlling one or more of the mechanisms and devices and/or the conveyor of said replacement device.

2. The replacement device as claimed in claim 1, wherein said positioner is a hinged arm having an end provided with said holder element.

3. The replacement device as claimed in claim 1, wherein said conveyor is a turntable for turning about an axis of rotation, with said first station, second station, third station, and fourth station being distributed around the turntable.

4. The replacement device as claimed in claim 3, wherein said first, second, third and fourth stations are arranged at corners of a square centered on the axis of rotation of said turntable, and said turntable has four insert receptacles arranged at corners of a square, such that when one of said receptacles is facing any one of said stations, each of the other three receptacles is facing another one of said stations.

5. A method of replacing one or more machining inserts on a tool having a body and a head carrying at least one machining insert, each insert presenting at least one edge and a hole, and being held on said head by a screw passing through said hole, the method comprising the following steps:

a) providing a positioner having a holder element suitable for receiving said body of the tool, and placing the body in said holder element;

b) using said positioner to position said head so that the screw holding an insert that presents a blunt edge is in alignment with the main axis of a screw gun, and then unscrewing the screw with said screw gun;

c) using a grip device to pick up said insert;

d) providing a conveyor having a plurality of receptacles for inserts and having distributed therealong a first station with the grip device, a second station with a turning mechanism for turning inserts on themselves, a third station with an unloading mechanism for unloading inserts, and a fourth station with a feed mechanism for feeding inserts;

e) using a transport mechanism to move said grip device between the positioner and the first station, and then using said grip device to put said insert down on the receptacle that is facing said first station;

f) performing steps g), h), l) if said insert presents at least one sharp edge, or performing steps i), j), k), l) if said insert does not present any sharp edges;

g) causing said conveyor to move so to bring said receptacle from the first station to said second station and then using the turning mechanism to cause said insert to turn on itself so as to position said sharp edge in a position of said blunt edge;

h) causing said conveyor to move so as to return said receptacle from said second station to said first station;

i) causing said conveyor to move so as to bring said receptacle from the first station to said third station, and then using an unloading mechanism to remove the insert from the receptacle on which said insert is to be found, so that the receptacle is empty;

j) causing said conveyor to move so as to bring said receptacle from the third station to said fourth station, and then using a feed mechanism to place a new insert on said receptacle;

k) moving said conveyor so as to bring said receptacle from said fourth station to said first station;

l) using the grip device to take hold of said insert, and then using said transport mechanism to transport the grip device from the first station to the positioner, and then placing the insert on its location on the head in such a manner that the hole in the insert is in line with the rod of the screw gun; and m) placing a screw in said hole and then using the screw gun to screw the insert onto the head of the turntable.

6. The method as claimed in claim 5, wherein said conveyor is a turntable for turning about an axis of rotation and having said first station, said second station, said third station, and said fourth station distributed around the turntable.

* * * * *